United States Patent Office 3,712,865
Patented Jan. 23, 1973

3,712,865
EDIBLE OIL EMULSIONS
Mervyn Thomas Arthur Evans, Ayot St. Lawrence, and Laurence Ian Irons and John Richard Mitchell, St. Albans, England, assignors to Lever Brothers Company, New York, N.Y.
No Drawing. Filed Dec. 30, 1969, Ser. No. 889,289
Claims priority, application Great Britain, Dec. 31, 1968, 61,976/68
Int. Cl. B01j 13/00
U.S. Cl. 252—312
11 Claims

ABSTRACT OF THE DISCLOSURE

The emulsifying properties of protein used in food emulsions such as ice cream are improved by acylation, the acyl group being that of an aliphatic monocarboxylic acid of from 4 to 10 carbon atoms. The degree of acylation may be as much as 80% or even more, and is readily effected by acylation in aqueous solution with the corresponding anhydride by pH control. The heat-coagulable N-acylated proteins are novel.

This invention relates to aqueous emulsions and to proteinaceous emulsifiers for use in them.

In aqueous emulsions containing edible oil and protein, the protein influences the structure and stability of the emulsion. The polypeptide structure of the protein carries both hydrophilic and hydrophobic side chains and protein is therefore drawn to and collects at the interface between the oil and water phases. Because of the forces acting at the interface the protein may become partly denatured, losing its native conformation in order to take up a configuration of minimum strain between the oil and water molecules. In this way proteins act as emulsifiers to stabilise the boundary between the oil and water phases so that disperse phase droplets of oil in an aqueous emulsion do not coalesce and the structure of the emulsion is maintained. Thus in milk the emulsion of milk fat in water is stabilised by the milk protein, and a milk protein fraction, particularly casein in the form of sodium caseinate, is often used as an emulsifier in artificial food emulsions of the oil-in-water type. Where different proteins are present they may act one upon another at the interface, and an instance of this is described in British patent specification 1,158,103, where such interaction is used to improve the structural properties of edible emulsions.

In the preparation of food emulsions containing proteins it is often desirable or necessary to pasteurise or sterilise the emulsions by heating to such an extent that those proteins sensitive to heat undergo a more extensive and irreversible denaturation, so that they are coagulated. They become difficult to redisperse and obtain in stable liquid form and their surface activity is lost because they can no longer freely distribute and align themselves at the oil/water interface. Thus the protein of egg white is readily denatured on heating and loses its emulsifying properties. Whey protein, which is the protein content of milk casein, is partly heat denatured and insolubilised when whey is concentrated by evaporation. This is a problem, for the quality of the whey powder obtained is lowered.

Some food emulsions containing edible oil and protein are used in a form in which air or other gas is incorporated as a disperse phase and the capacity for holding the gas phase is important, as in ice cream manufacture, where gas is whipped or beaten into the emulsion. The gas-holding capacity is influenced by the protein present, due to interaction at the gas-liquid interface, and the strength of the interaction is reflected in the foaming properties of the emulsion.

The behaviour of a protein as an emulsifier in a particular oil-in-water system will depend upon the pH of the system and its relationship to the isoelectric point of the protein, which is the pH at which the average net charge remaining on the protein is zero. Solubility of a protein is at a minimum at its isoelectric point and its hydrophilic-lipophilic balance alters with changing pH. Hence the capacity of a protein for acting as an emulsifier will be different at pHs substantially below, at, and substantially above the isoelectric point of the protein. The isoelectric points of some of the economically more important proteins used as emulsifiers are as follows:

Protein constituents of milk:
$\alpha_s$-Casein _____ [1] 4.4
$\beta$-Casein _____ [1] 4.5
$\gamma$-Casein _____ [1] 5.8
k-Casein _____ [1] 3.7
$\alpha$-Lactalbumin _____ [2] 5.1
$\beta$-Lactoglobulin _____ [2] 5.2
Egg white protein (largely ovalbumin) _____ 5.6
Soyabean protein (essentially glycinin) _____ 4.9

[1] Whole casein 4.6.
[2] Whole whey protein 5.2.

As the isoelectric points of these proteins effectively fall within the range of from 4 to 6, their behavior as emulsifying agents may be expected to alter over this range which is slightly on the acid side of neutrality, and over the physiological range of pH from 6 to 8.

A method has now been found of modifying these proteins so that their properties are improved: in particular the capacity of their aqueous solutions to provide stable foams is improved, and where the protein is heat-coagulable, its stability to heat-denaturation is increased. At the same time their isoelectric points are appreciably reduced. The modification consists of acylating the free amino groups present in the protein with the anhydride of an aliphatic monocarboxylic acid: this reacts with the N-terminal amino groups and free amino groups arising from the lysine residues of the protein, so that these groups become substituted by an acyl group, which is thus linked by peptide bonds in the same way that the amino-acid residues of the protein are linked by peptide bonds, and the charge and other characteristics of the protein are altered so that any instability to heat is removed and foaming properties improved. The basic amino groups which are acylated are thus replaced by acylamino groups.

According to this invention an aqueous oil emulsion contains an N-acylated protein, where the acyl group is that of an aliphatic monocarboxylic acid, of from 4 to 10 carbon atoms, preferably an n-acyl group.

Preferably the emulsion is an oil-in-water emulsion, particularly one in which the oil is an edible triglyceride oil. The emulsion preferably has a pH of from 4.1 to 4.5 to 9, and especially from 5 or 6 to 8 or 8.5. Suitable triglyceride oils are such vegetable oils as palm, palm kernel, coconut, groundnut, soyabean, rapeseed, corn, cottonseed, safflower, sunflower and olive oils.

The modified protein can be one derived from a protein having a substantial number of reactive amino groups, that is, acylatable free amino groups, and is thus one having a substantial number of amino-acid residues derived from lysine. The amount of reactive free amino group present in a particular protein can be determined by the ninhydrin reaction. The proteins are preferably native proteins. Suitable proteins are heat-coagulable proteins, for instance whole whey protein, egg yolk protein, egg white protein (especially ovalbumin), and blood serum protein (for instance bovine serum albumin). Other suitable proteins that are more heat-stable and which can be used are whole casein and gelatin. Soyabean protein can also be used. Preferably the lysine content of the protein is more than 4, especially more than 6, and is in practice less than 20, grams per 100 grams protein.

The acyl group introduced is one derived from an aliphatic acid containing from 4 to 10 carbon atoms, for instance an n-butyryl, n-valeryl, n-hexanoyl, n-heptanoyl, n-octanoyl or n-decanoyl group. A branched chain acyl group which can be introduced is the isobutyryl group.

The acyl group can be introduced by allowing an aqueous solution of the protein to stand at a suitable temperature with the anhydride of the appropriate carboxylic acid, in particular n-butyric, n-valeric, n-hexanoic or n-octanoic anhydride. It is preferable to conduct the reaction at a pH of from 6 to 9, especially from 7 to 8, for instance using a suitable buffer, in order to promote acylation rather than hydrolysis of the anhydride which occurs as a side-reaction with liberation of the free carboxylic acid. The action of the buffer can be supplemented by progressive addition of alkali to neutralise the free carboxylic acid formed.

The proportion of anhydride used will reflect the degree of acylation required and the extent of loss of anhydride by hydrolysis under the particular conditions used. The degree of acylation, that is, the proportion of the reactive amino groups in the protein that are acylated, is generally at least 20%, preferably at least 40 or 60%; 80% or more acylation is readily achieved by using a large excess of anhydride. The amount of anhydride required can be calculated according to the amount of reactive amino group present in the protein and a 20–30 fold excess, for instance, employed.

The degree of acylation achieved can be determined by measuring the amount of reactive amino group remaining in the product. Acylation of thiol and possibly hydroxyl groups in the protein may also occur. If desired, any by-product free carboxylic acid or excess anhydride unhydrolysed at the completion of the reaction can be removed by dialysis or gel filtration, and electrodialysis can be employed to accelerate the removal of acid. The product is conveniently dried, for instance freeze-dried or spray-dried, to produce a powdered solid, which can be readily dissolved in water when required.

The emulsifiers of the invention are the above-described N-acylated heat-coagulable proteins that are new substances. The invention also includes both the process of making them, in which the protein is acylated in aqueous or other solution with the anhydride of the corresponding carboxylic acid, and aqueous solutions containing them, with or without other proteins.

An emulsion of the invention can contain from 5 to 70% by weight of triglyceride oil, from 0.05 to 10, and preferably from 0.1 to 5% of N-acylated protein, together with sweetening and flavouring agents, further emulsifiers, for instance a fatty acid monoglyceride, carbohydrate stabilisers, for instance locust bean gum, and from about 30 to about 95% of water.

In making an emulsion of the invention the triglyceride oil, water and N-acylated protein and any other ingredients are mixed together and homogenised. The invention accordingly includes a process for preparing an aqueous oil emulsion which comprises emulsifying an edible glyceride oil with an aqueous solution containing N-acylated protein until an oil-in-water emulsion is formed. Where the oil content is high it is preferable to introduce the oil gradually into the aqueous phase containing N-acylated protein with vigorous stirring. The pH can be adjusted as desired before homogenisation by addition of the appropriate amount of base or acid.

The emulsions prepared can contain a dispersed gas phase: they can be formulated for use in toilet preparations or as ice cream mixes from which ice creams are obtained by freezing and beating in air. Such ice creams are particularly valuable, as it has been discovered that, owing to the special foaming properties of the acylated proteins, they can be prepared with a relatively high overrun and yet remain as free from shrinkage on storage as ice creams without the acylated proteins, and are also less liable to suffer such shrinkage at equivalent overrun. In such ice creams preferably at least 10% of the protein of the normal mix is replaced by N-acylated protein, for instance 50%, 25% or even 10% of the protein content of spray-dried milk powder used in formulating an ice cream can be replaced for example, with N-acylated casein, with a substantial improvement in the structure of the product.

Preferably the emulsion is pasteurised or sterilised by heat after it has been prepared, for instance by maintaining it at 90° C. for 10 minutes.

The invention is illustrated by the following examples, in which temperatures are in ° C.

EXAMPLE 1

Fresh milk was warmed to 35°, N hydrochloric acid added slowly with stirring until the pH was 4.6, and stirring continued for 30 minutes. The precipitated fat and casein were removed by centrifugation and the resulting whey supernatant was dialysed at 2° for 48 hours against a pH 6.5 phosphate buffer (containing 6.9 mM. monosodium phosphate and 4.4 mM. disodium phosphate) to remove a part of the lactose, the buffer being replaced by fresh buffer several times during the dialysis. The resulting solution was freeze-dried.

The freeze-dried whey (2 g., containing about 70% protein and about 10 grams of lysine per 100 grams protein) was dissolved in pH 7 phosphate buffer (containing 0.08 M sodium chloride, 3.05 mM. monosodium phosphate and 5.65 mM. disodium phosphate, 250 ml.) and to the solution at 3° was added n-hexanoic anhydride (4 ml.) dropwise during 1 hour, the pH being measured continuously by pH meter and maintained at between 7 and 8 by the dropwise addition of N aqueous sodium hydroxide solution. Stirring was continued overnight at 4° and the solution was then dialysed against distilled water until salt-free: the solution was finally freeze-dried to give an N-acylated whole whey protein as a fluffy powder (2 g.), the original protein having had more than 80% of its reactive amino groups acylated with an n-hexanoyl group.

A 1% solution of the N-acylated protein in phosphate buffer of pH 7.0 remained clear on heating at 100° for 30 minutes, while a 1% aqueous solution of the protein starting material treated in the same way precipitated a white coagulate within 5 minutes.

The foaming properties of a 0.05% solution of the N-acylated protein in phosphate buffer of pH 7.2 were examined by passing air through a sintered disc into the bottom end of a long vertical glass tube of 4 cm. diameter containing 100 ml. solution and observing the stability of the resulting foam when the air supply was cut off. The time taken for half the foam to collapse was 120 minutes, while the time taken with a corresponding solution of the unacylated protein was 25 minutes, thus showing the improved foaming properties produced by acylation.

EXAMPLE 2

Crystalline ovalbumin (1 g., containing 5 g. lysine per 100 g. protein) was dissolved in pH 7 phosphate buffer (containing 0.08 M sodium chloride, 3.05 mM. monosodium phosphate and 5.65 mM. disodium phosphate, 150 ml.). n-Hexanoic anhydride (2 ml.) was added slowly with stirring during 1 hour to the protein solution at 4°, the pH being measured continuously by pH meter and maintained at between 7 and 8 by the dropwise addition to the stirred solution of N aqueous sodium hydroxide solution. Stirring was continued overnight at 4°, the solution centrifuged at 10,000 r.p.m. for 30 minutes to remove a little coagulated material, and then dialysed against distilled water at pH 7 and finally freeze-dried. The product (1 g.) was a fluffy white powder consisting of ovalbumin with more than 80% of its reactive amino groups acylated with an n-hexanoyl group.

When a 2% solution of the N-acylated protein in phosphate buffer of pH 7 was tested for heat-stability as in Example 1 a clear solution remained after 30 minutes, whereas a 2% solution of the unacylated protein gelled within 5 minutes. The acylated protein was tested in 0.05% solution for its foaming properties as before and not only was a much greater height of foam obtained than when the unacylated protein was used, but the time for half-collapse of foam was 130 minutes as compared with 2 to 3 minutes with the unacylated protein.

EXAMPLE 3

Crystalline bovine serum albumin (1 g., containing 11 g. lysine per 100 g. protein) was acylated with n-hexanoic anhydride using the procedure described in Example 2 for ovalbumin. The freeze-dried fluffy white powder obtained was the albumin with more than 80% of its reactive amino groups acylated with an n-hexanoyl group and was tested for its stability to heat and its foaming properties as before. While a 1% solution of bovine serum albumin in phosphate buffer of pH 7.0 became cloudy within 5 minutes at 100°, the 1% solution of N-acylated protein remained clear after 30 minutes at 100°. A 0.05% solution of bovine serum albumin provided no foam in the foaming test, while the N-acylated protein solution gave a foam height of 47 cm. whose time of half-collapse was 135 minutes.

EXAMPLE 4

Horse-heart cytochrome C (0.1 g., containing 19 g. lysine per 100 g. protein) was dissolved in pH 7 phosphate buffer (50 ml.) at 2°. n-Hexanoic anhydride (0.5 ml.) was added slowly with gentle stirring and the pH of the solution maintained at 7.5 by dropwise addition of alkali as required during 5 hours. The reaction mixture was then dialysed against distilled water at pH 7 and freeze-dried. The N-acylated cytochrome C obtained was a pale pink solid having more than 80% of the reactive amino groups of the original protein acylated with an n-hexanoyl group. Its 0.05% aqueous solution exhibited strong foaming properties, the foam showing a time for half-collapse of 225 minutes, while a corresponding solution of cytochrome C gave only two-thirds the height of foam and this totally collapsed in 3 minutes.

EXAMPLE 5

Sheet gelatin (1 g., containing 4.6 g. lysine per 100 g. protein) was dissolved in pH 8 phosphate buffer solution (containing 2% disodium phosphate, 50 ml.) by heating to 40°, giving a clear solution; this was cooled to ambient temperature and n-hexanoic anhydride (2 ml.) was added dropwise; N aqueous sodium hydroxide solution was added as required to maintain pH 8.0. After 3 hours the solution was cloudy: it was allowed to stand overnight at 2°, dialysed and the solution obtained freeze-dried to give a spongy white solid (1 g.) consisting of gelatin having more than 80% of its reactive amino groups acylated with an n-hexanoyl group. When used as a 0.05% solution in phosphate buffer pH 7.2 in the test referred to above, the N-acylated gelatin exhibited strong foaming properties and the time taken for a quarter of the foam to collapse was 120 minutes compared with 17 minutes for the unacylated gelatin.

EXAMPLE 6

Groundnut oil (30 g.) and the freeze-dried hexanoylated whole whey protein of Example 1 (1.5 g.) dissolved in water (268.5 g.) were mixed at ambient temperature and homogenised at 1000 lb./in.$^2$: the fat droplets dispersed and formed an oil-in-water emulsion of pH 7. A small portion of this emulsion (20 ml.) was heated for 30 minutes in a waterbath at 100°; 5 ml. was taken and diluted with water to 100 ml.: a dilute emulsion was formed which was stable for at least 3 hours.

When a corresponding amount of unmodified freeze-dried whey was used in the same way, the emulsion broke with formation of a cream of fat droplets within 30 minutes.

Similar emulsions are formed when the hexanoylated whole whey protein is replaced by the hexanoylated protein of any one of Examples 2 to 4.

EXAMPLE 7

This example describes the preparation of an emulsion containing hexanoylated casein and its conversion to ice cream.

To freeze-dried acid casein (10 g.) dissolved in 2% aqueous disodium phosphate buffer (500 ml.) at ambient temperature was added n-hexanoic anhydride (20 ml.) dropwise with stirring during 1 hour, the solution being maintained at pH 7 to 8 by dropwise addition of N sodium hydroxide solution, and stirring continued for 3 hours. After standing at 2° for 24 hours the reaction mixture was filtered, exhaustively dialysed against distilled water and freeze-dried to give a fluffy white powder n-hexanoylated casein having more than 80% of the reactive amino groups of the original casein acylated with an n-hexanoyl group.

Lactose (5.26 parts by weight), whey powder (10.25 parts), sodium caseinate (1.66 parts) and the hexanoylated casein (1.66 parts) were dissolved in water (63.3 parts) at 60° with stirring: sucrose (16 parts), locust bean gum (0.175 parts) and salt (0.045 part), together with flavour and colour, were then added to form the aqueous phase of an emulsion.

Palm oil of M.P. 30° (9.45 parts) was heated to 60° and a monoglyceride of the fatty acids of groundnut oil (0.46 part) was dispersed in it with stirring to form a fat phase.

The aqueous and fat phases were mixed at 60°, passed through a homogeniser operating at a pressure of 1000 lb./in.$^2$, and the oil-in-water emulsion formed (of pH about 7) was heated to 75° for 15 minutes for pasteurisation, then cooled to +1° and loaded into a bowl chilled in a bath at −30° (the interior surface of the bowl being at −6°). Air was then beaten into the emulsion and the overrun and temperature of the ice cream produced was measured every 5 minutes by removal and weighing of a small sample of known volume; by this means the maximum overrun and the temperature at which it was attained were determined.

A typical maximum overrun obtained in a series of such preparations was 130° at −2.6°, as compared with 110–20% at that temperature when the hexanoylated casein was replaced by the same amount of sodium caseinate.

An ice cream of increased overrun is similarly formed when the hexanoylated casein is replaced by the hexanoylated gelatin of Example 5.

EXAMPLES 8 TO 18

To spray-dried sodium caseinate of food grade (850 g.) dissolved in distilled water (14 litres) was added a fatty acid anhydride (of identity and in quantity given below) during 5 minutes with stirring, and the solution then maintained for 4 to 5 hours at pH 8.5 by dropwise addition of 20% aqueous sodium hydroxide solution and the reaction mixture stored at 5° C. for 2 days. The mixture was filtered and diluted with an equal volume of distilled water, and the resulting solution passed through a column (of diameter 4 inches and height 3.5 feet) of the cross-linked dextran of particle diameter 50–150$\mu$ known commercially as Sephadex gel G 25 Medium (1.4 kg.) which had been equilibrated with aqueous ammonium bicarbonate buffer (0.1 M, pH 8). Successive portions of 1 litre of reaction mixture were passed down the column using ammonium bicarbonate buffer to elute the acylated casein, and after each portion had been eluted the trapped smaller molecules (for instance sodium salt of fatty acid) which it was desired to remove from the acylated casein were themselves removed from the column by back-washing. The movement of acylated casein through the column was traced by tests with trichloroacetic acid (0.1 M) which gave a precipitate with samples containing acylated casein. Each elution stage required about 45 minutes, and back-washing required the same.

The eluted acylated casein solution (60-70 litres) obtained was concentrated in a climbing film evaporator at a reduced pressure of 12-25 mm. mercury, water being removed at 3-4 litres an hour at 60-65° C. The concentrate was freeze-dried to give the acylated casein as a fluffy buff powder.

Acylated caseins were prepared by the above-process using n-butyric and n-hexanoic anhydrides in the quantities indicated, the excess being that over the amount theoretically required to react with all free amino groups of the caseins, and the degree of substitution of reactive amino groups measured by the ninhydrin method.

| Anhydride | Weight (g.) | Percent excess | Percent substitution |
|---|---|---|---|
| n-Butyric | 93 | 125 | 45 |
| | 175 | 190 | 60 |
| | 280 | 245 | 90 |
| n-Hexanoic | 140 | 160 | 45 |
| | 140 | 160 | 42 |
| | 375 | 250 | 60 |
| | 450 | 370 | 75 |

The acylated caseins were then used in the preparation of ice cream formulations. A standard ice cream was first prepared by the following procedure.

Spray-dried milk powder (10.5 parts by weight, containing 33.3% protein) was dispersed in cold water (63.3 parts) and the mixture heated gently to 40° C.; to this was added sugar (16 parts) and locust bean gum (0.175 part) previously mixed with a small part of the sugar, followed by salt (0.045 part), and water soluble flavouring and the mixture heated to 60° C. to give the aqueous phase of the ice cream.

Fatty acid monoglyceride (0.0458 part) derived from groundnut oil by interesterification with glycerol was stirred into palm oil (9.45 parts) at 60° C., and flavour added to give the oil phase. This hot oil phase was then poured into the hot aqueous phase with vigorous stirring and the dispersion obtained was homogenised at 2000 p.s.i. pressure and then pasteurised at 75° C. for 15 minutes, cooled to 0° C. and stored for 2 hours.

The ice cream mix thus obtained was placed in a sterilised 30 lb. Giusti batch freezer, an overrun cup full of liquid mix weighed, and the mix agitated and chilled to —4° C.; chilling was then halted and the batch then aerated for 1 minute under a pressure of 10 p.s.i. to give an ice cream. The overrun of the product was measured by drawing off a sample into the overrun cup and weighing it. Overrun is calculated as $$100 \left( \frac{\text{weight of unaerated mix}}{\text{weight of aerated mix}} \right) - 1$$

A series of ice cream batches were made in this way to test the reproducibility of the overrun.

Similar ice creams were prepared in which the spray-dried milk powder (SDMP) was partially replaced by either sodium caseinate or by an acylated casein as shown in the following table, and the overrun obtained measured as before. The results demonstrate an increase in overrun in every instance where acylated casein was present over that obtained without acylated casein and with or without unmodified casein.

Standard packets were also filled with each aerated mix, weighed and placed in a blast freezer at —28° C. for 24 hours, after which they were stored at —20° C. After two months the fillings of the packets of ice cream containing the acylated protein showed little or no shrinkage, and were certainly as good in respect of shrinkage as the ice creams containing no acylated protein, even though they had a higher overrun.

| | Example numbers | | | | | | | | | | |
|---|---|---|---|---|---|---|---|---|---|---|---|
| | 8 | 9 | 10 | 11 | 12 | 13 | 14 | 15 | 16 | 17 | 18 |
| Protein components, parts by weight: | | | | | | | | | | | |
| SDMP | 10.5 | 9.65 | 8.75 | 9.65 | 8.75 | 9.65 | 9.65 | 8.75 | 10.15 | 9.65 | 9.65 | 8.75 | 9.65 | 8.75 |
| Sodium caseinate | | | | 0.85 | 1.75 | | | | | | | |
| Butyryl casein: | | | | | | | | | | | | |
| 45% | | | | | | 0.85 | 1.75 | | | | | |
| 60% | | | | | | | | 0.85 | | | | |
| 90% | | | | | | | | | 0.85 | 1.75 | | |
| Hexanoyl casein: | | | | | | | | | | | | |
| 42% | | | | | | | | | | 0.35 | 0.85 | |
| 60% | | | | | | | | | | | | 0.85 | 1.75 |
| 75% | | | | | | | | | | | | | | 0.85 | 1.75 |
| Replacement of protein in SDMP, percent | | 25 | 50 | 25 | 50 | 25 | 25 | 50 | 10 | 25 | 25 | 50 | 25 | 50 |
| Increased protein content of mix, percent | | 16.4 | 33.3 | 16.4 | 33.3 | 16.4 | 16.4 | 33.3 | 6.7 | 16.4 | 16.4 | 33.3 | 16.4 | 33.3 |
| Overrun | | 101 | 107 | 112 | 120 | 120 | 130 | 127 | 132 | 122 | 124 | 125 | 121 | 140 | 120 |
| | | 105 | 103 | 105 | | | | | | | | |
| | | 103 | 104 | 100 | | | | | | | | |
| | | 114 | | | | | | | | | | |
| | | 113 | | | | | | | | | | |
| Average | | 107 | 105 | 106 | | | | | | | | |

What is claimed is:

1. An aqueous oil-in-water emulsion comprising from 5 to 70% by weight of edible triglyceride oil, from about 95 to about 30% by weight water, and from 0.05 to 10% by weight of an N-acylated protein, the protein having an aminoacid content of at least 4 grams of lysine per 100 grams of protein having been replaced by acylamino groups RCONG—, where RCO— is the acyl group of an aliphatic monocarboxylic acid of from 4 to 10 carbon atoms.

2. An emulsion according to claim 1, where at least 40% of the free amino groups of the protein have been replaced by the acylamino groups.

3. An emulsion according to claim 2, where the acyl group is an n-butyryl group.

4. An emulsion according to claim 2, where the acyl group is an n-hexanoyl group.

5. An emulsion according to claim 2, where the N-acylated protein is an N-acylated milk protein.

6. An emulsion according to claim 3, where the N-acylated protein is N-acylated whole whey protein.

7. An emulsion according to claim 3, where the N-acylated protein is N-acylated whole casein.

8. An emulsion according to claim 3, where the N-acylated protein is N-acylated ovalbumin or bovine serum albumin.

9. An emulsion according to claim 1 which contains a dispersed gas phase and has been frozen to form an ice cream.

10. An emulsion according to claim 9 where the N-acylated protein is N-acylated whole casein, and at least 40% of the free amino groups of the casein have been replaced by n-butyryl groups.

11. An emulsion according to claim 9, where the N-acylated protein is N-acylated whole casein, and at least 40% of the free amino groups of the casein have been replaced by n-hexanoyl groups.

References Cited

UNITED STATES PATENTS

| | | | |
|---|---|---|---|
| 2,398,313 | 3/1946 | Mackenzie | 252—356 |
| 2,858,300 | 10/1958 | Kerr | 260—112 |
| 2,932,589 | 3/1960 | Meyer et al. | 117—156 |

FOREIGN PATENTS 1,002,732   11/1951   France.

OTHER REFERENCES

Gordon et al.: "Higher Fatty Acid Derivatives of Proteins," I. & E. Chem., vol. 38, #12 (December 1949), pp. 1239–42.

JOHN D. WELSH, Primary Examiner

U.S. Cl. X.R.

99—136; 252—356; 260—112